US009345081B2

(12) United States Patent
Zhang et al.

(10) Patent No.: US 9,345,081 B2
(45) Date of Patent: May 17, 2016

(54) LED DRIVER SYSTEM, CONTROLLER AND ASSOCIATED METHOD

(71) Applicant: Chengdu Monolithic Power Systems Co., Ltd., Chengdu (CN)

(72) Inventors: Jian Zhang, Chengdu (CN); Zhijiang Yang, Chengdu (CN)

(73) Assignee: Chengdu Monolithic Power Systems Co. Ltd., Chengdu (CN)

( * ) Notice: Subject to any disclaimer, the term of this patent is extended or adjusted under 35 U.S.C. 154(b) by 147 days.

(21) Appl. No.: 14/289,461

(22) Filed: May 28, 2014

(65) Prior Publication Data

US 2014/0354159 A1 Dec. 4, 2014

(30) Foreign Application Priority Data

May 29, 2013 (CN) .......................... 2013 1 0205083

(51) Int. Cl.
*H05B 37/02* (2006.01)
*H05B 33/08* (2006.01)

(52) U.S. Cl.
CPC .......... *H05B 33/0815* (2013.01); *H05B 33/089* (2013.01); *H05B 33/0827* (2013.01)

(58) Field of Classification Search
CPC .... H05B 37/02; H05B 33/08; H05B 33/0815; H05B 33/0827; H05B 33/0884; H05B 33/089
USPC .......... 315/185 R, 209 R, 224, 225, 291, 307, 315/308, 312
See application file for complete search history.

(56) References Cited

U.S. PATENT DOCUMENTS 7,688,009 B2 * 3/2010 Bayadroun ........ H05B 33/0803 315/224

* cited by examiner

*Primary Examiner* — Jimmy Vu
(74) *Attorney, Agent, or Firm* — Perkins Coie LLP

(57) ABSTRACT

A LED driver system includes a LED converter converting an input voltage to an output voltage to drive a LED load via a main switch; a sensing circuit generating a feedback signal on the output terminal according to a load current through the LED load; an over-shoot detecting circuit generating an over-shoot signal according to the load current and a second reference signal; a logic circuit generating a switching signal according to a control signal and the over-shoot signal to control the main switch. The control signal is generated according to the feedback signal and a first reference signal, and the second reference signal is larger than the first reference signal.

20 Claims, 7 Drawing Sheets

LED DRIVER SYSTEM, CONTROLLER AND ASSOCIATED METHOD

CROSS-REFERENCE TO RELATED APPLICATION(S)

This application claims the benefit of CN application No. 201310205083.3, filed on May 29, 2013, and incorporated herein by reference.

TECHNICAL FIELD

The present invention generally relates to circuitry, and more particularly but not exclusively relates to LED driver system.

BACKGROUND

LED (Light Emitting Diode) is a solid semiconductor device that direct transmits electric energy to visible light. It has advantages such as easy control, low voltage DC driving, and long life-time. Currently, LED is widely applied in many occasions, for example, lighting, display backlit, and display screen.

For preventing voltage spike damaging LED devices when LED driver system is starting, soft-start technology is conventionally applied on LED driver system. This technology comprises charging a start capacitor in controller, and so that voltage across LED device could rise gently until the start of LED driver is completed.

FIG. 1 illustrates a schematic circuit diagram of a soft-start LED driver controller 10 as a prior art. As shown in FIG. 1, when the system is starting, LED driver controller 10 receives a feedback signal VFB from LED string. An error amplifier 101 generates a compensating signal COMP according to the feedback signal VFB and a reference signal VREF. The compensating signal COMP is derived by the error amplifier 101 sourcing or sinking current to a compensating network 102 in which a compensating capacitor CCOMP and a compensating resistor RCOMP are coupled in series. As the voltage across the compensating capacitor CCOMP could not change suddenly, the compensating signal COMP rises gently during the system starting. The compensating signal COMP is compared with a sensed slope signal Slope indicative of a load current of LED string via a comparator 103. The comparator 103 generates a control signal CTRL to control a LED driver 104 to supply energy to LED strings.

However, after the soft-start is completed, the compensating capacitor CCOMP should be discharged to make the system restore to steady state. As the discharging process takes time, the compensating signal COMP may not fall to target value in time. Accordingly, a voltage spike may be generated on the voltage across the LED load after the starting is completed and before the system works in steady state. When the LED load is relatively light, the voltage spike may lead to voltage overshot, so as to trigger OVP (over-voltage protection) or OCP (over-current protection), or even causing damage.

SUMMARY

A LED driver system, comprising a LED converter, the LED converter at least comprising a main switch, configured to convert an input voltage to an output voltage to drive a LED load; a sensing circuit, having an input terminal and an output terminal, wherein the input terminal is coupled to the LED load, the sensing circuit configured to generate a feedback signal on the output terminal according to a load current through the LED load; an over-shoot detecting circuit, the over-shoot detecting circuit coupled to the sensing circuit, and further receiving a second reference signal, configured to generate an over-shoot signal according to the load current and the second reference signal; a logic circuit, the logic circuit receiving the over-shoot signal and a control signal, configured to generate a switching signal accordingly to control the main switch ON and OFF, wherein the control signal is generated according to the feedback signal and a first reference signal; wherein the second reference signal is larger than the first reference signal.

BRIEF DESCRIPTION OF THE DRAWINGS

Non-limiting and non-exhaustive embodiments are described with reference to the following drawings. The drawings are not depicted to scale and only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
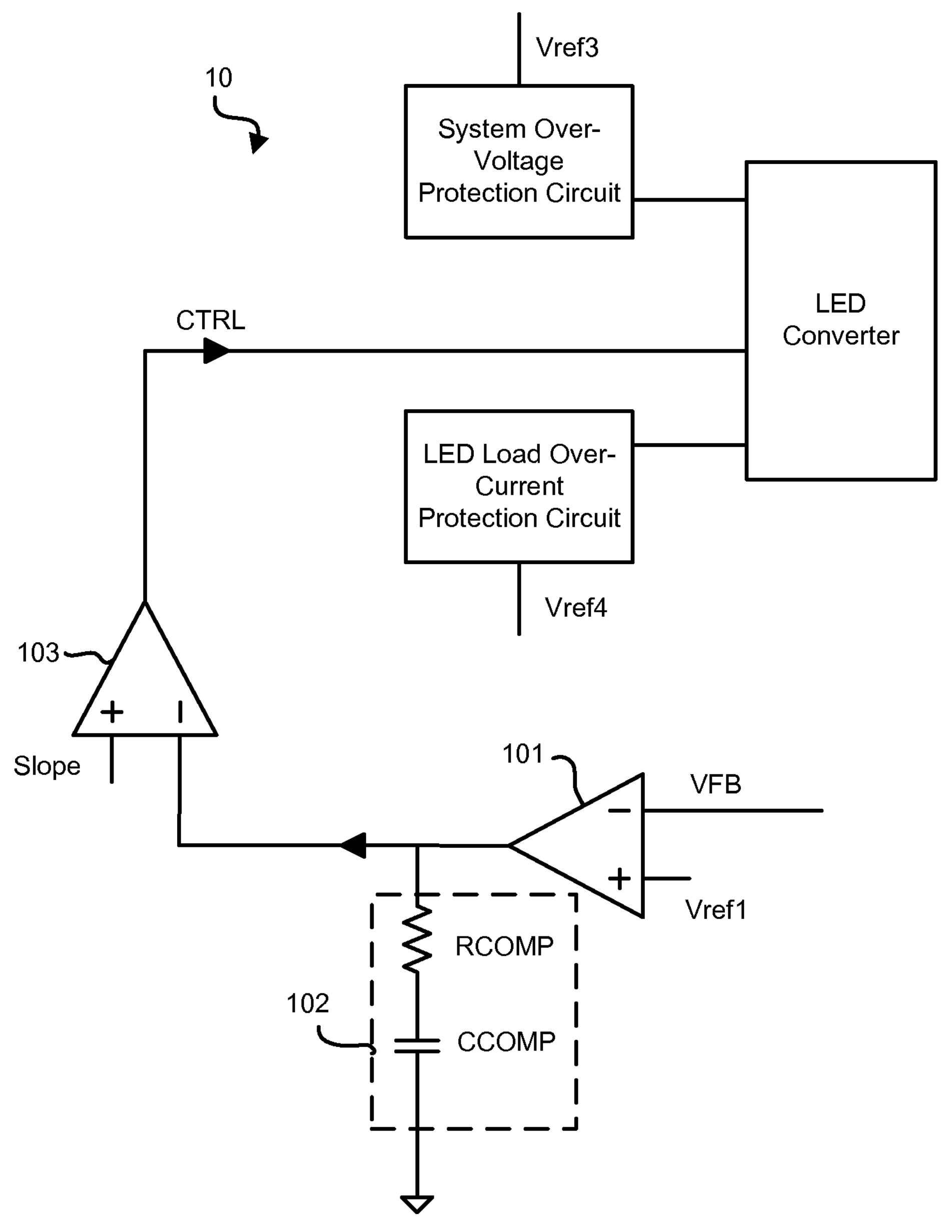
FIG. 1 illustrates a schematic circuit diagram of a soft-start LED driver controller 10 as a prior art.
Figure 2:
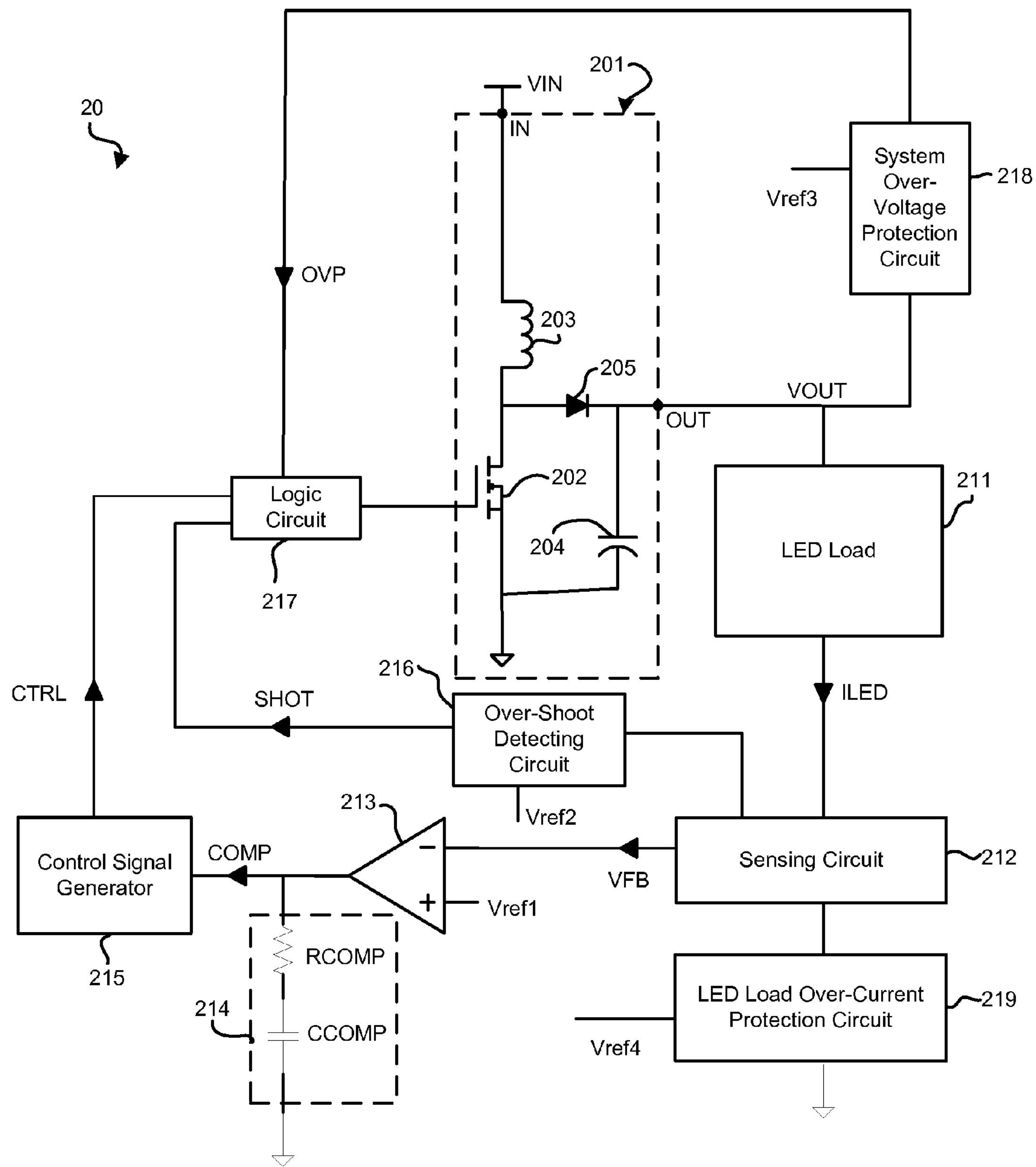
FIG. 2 illustrates a schematic block diagram of a LED driver system 20 according to an embodiment of the present invention.

FIG. 2 illustrates a schematic block diagram of a LED driver system 20 according to an embodiment of the present invention. As shown in FIG. 2, the LED driver system 20 comprises a LED converter 201 for LED driving. In the illustrated embodiment shown in FIG. 2, the LED converter 201 is a boost converter, comprising a power switch 202 as main switch of the LED driver system 20, an output inductor 203, an output capacitor 204 and a rectifier 205, wherein the rectifier 203 may be a diode or a synchronous switch. In other embodiments, LED converter 201 may have other different types of topologic structures, such as buck converter, fly-back converter, LLC resonant half-bridge converter, and etc. Correspondingly, the LED driver system 20 may comprise two or more power switches as main switch or synchronous switch in accordance with particular topology. For example, in a buck converter, the item "power switch" may refer to both high side switch and low side switch. LED converter 201 has an input terminal IN receiving an input voltage VIN, and converts the input voltage VIN into an output voltage VOUT at an output terminal OUT. A LED load 211 is coupled to the output terminal OUT of the LED converter 201 to receive the output voltage VOUT.

LED driver system 20 further comprises a LED driver controller. In one embodiment, the LED driver controller comprises a sensing circuit 212, an error amplifier 213 and a compensating network 214, wherein the sensing circuit 212 is coupled to the LED load 211 with an input terminal, and generates a feedback signal VFB according to a load current ILED through the LED load 211. In the illustrated embodiment, the feedback signal VFB is a voltage signal, and in other embodiments, the feedback signal VFB may be a current signal or any other suitable type of signal.

The feedback signal VFB is provided to the error amplifier 213. The error amplifier 213 has a non-inverting input terminal, an inverting input terminal and an output terminal, wherein the non-inverting input terminal receives a first reference signal Vref1, and the inverting input terminal receives the feedback signal VFB. In one embodiment, the error amplifier 213 is a transconductance amplifier. The compensating network 214 is coupled between the output terminal of the error amplifier 213 and a system reference ground GND, to provide a compensating signal COMP on the output terminal of the error amplifier 213. In one embodiment, the compensating network 214 comprises a compensating resistor RCOMP and a compensating capacitor CCOMP coupled in series. The compensating signal COMP is generated by means of the error amplifier 213 sourcing or sinking current to the compensating capacitor CCOMP. In other embodiments, the compensating network 214 may has other different circuit structures.

The LED driver controller further comprises a control signal generator 215, an over-shoot detecting circuit 216 and a logic circuit 217, wherein the control signal generator 215 is coupled to the output terminal of the error amplifier 213 to receive the compensating signal COMP, and generates a control signal CTRL accordingly. The control signal CTRL may be a pulse width modulation (PWM) signal, or a pulse frequency modulation (PFM) signal, and any other suitable control signal. The over-shoot detecting circuit 216 is coupled to the sensing circuit 212 and receives a second reference signal Vref2, operable to generate an over-shoot signal SHOT to decide whether the output voltage VOUT is overshot according to the load current ILED and the second reference signal Vref2. In one embodiment, the second reference signal Vref2 is larger than the first reference signal Vref1. The logic circuit 217 receives the control signal CTRL from the control signal generator 215, and the over-shoot signal SHOT from the over-shoot detecting circuit 216, operable to generate a switching signal Vsw, the switching signal Vsw configured to control the main switch 202 (or other power switches in other embodiments) ON and OFF, wherein if the over-shoot circuit 216 decides that the output voltage VOUT is over-shot, the over-shoot signal SHOT deactivates the switching signal Vsw, and after the over-shoot ends, the over-shoot signal SHOT reactivates the switching signal Vsw.

In one embodiment, LED driver system 20 may further comprise an optional protection circuit, wherein the protection circuit comprises a system over-voltage protection circuit 218 and a LED load over-current protection circuit 219. The system over-voltage protection circuit 218 receives the output voltage VOUT and a third reference signal Vref3, operable to generate an over-voltage signal OVP to the logic circuit 217 according to the output voltage VOUT and the third reference signal Vref3. The over-voltage signal OVP indicates whether the output voltage VOUT is above normal level, and is applied to shut down the LED driver system 20 when over-voltage is detected on the output voltage VOUT. In one embodiment, the third reference signal Vref3 is larger than the second reference signal Vref2. The LED load over-current protection circuit 219 is coupled to the sensing circuit 212, and further receives a fourth reference signal Vref4. When the load current ILED is above normal level, over-current is detected on the LED load, and the LED load over-current protection circuit 219 disconnects the LED load from the LED driver system 20. In one embodiment, the fourth reference signal Vref4 is larger than the second reference signal Vref2.

Figure 3:
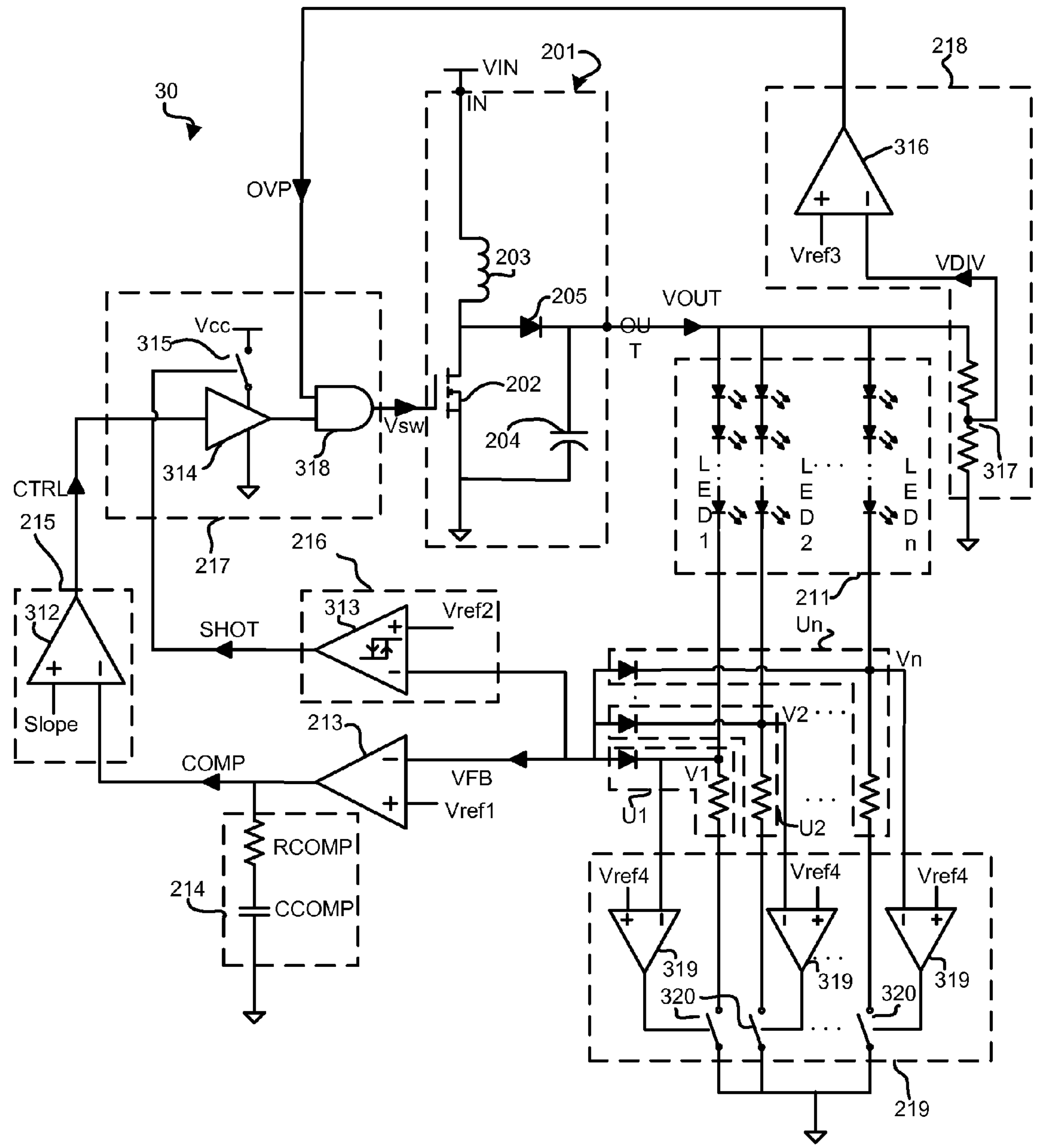
FIG. 3 illustrates a schematic circuit diagram of a LED driver system 30 according to an embodiment of the present invention.

FIG. 3 illustrates a schematic circuit diagram of a LED driver system 30 according to an embodiment of the present invention. As shown in FIG. 3, in the LED driver system 30, the LED load 211 comprises N LED strings LED1, LED2 . . . LEDN coupled in parallel, wherein N is a positive integer. One with ordinary skill in the art could understand that in other embodiments, the type or quantity of LED load 211 may be different from the illustrated embodiment. For example, in some embodiments, LED load 211 may comprise one or a plurality of LED arrays or LED displays. The sensing circuit 212 comprises N sensing units U1, U2 . . . UN, respectively coupled to N LED strings LED1, LED2 . . . LEDN. Each of the sensing unit comprises a diode and a sensing resistor, wherein the sensing resistor is coupled between a corresponding LED string and the system reference ground GND. An anode of the diode is coupled to a junction between the sensing resistor and the corresponding LED string, and a cathode of the diode is connected to cathodes of all other diodes in other sensing units, to provide the feedback signal VFB. Thus the feedback signal VFB=f[min(V1, V2 . . . VN)], wherein V1, V2 . . . VN are sensed signals respectively generated by the load current through each of sensing resistor. The feedback signal is determined by a minimum current among N load currents respectively through N LED strings. One with ordinary skill in the art could understand that in other embodiment, subject to different control mode, the sensing circuit 212 may have circuit structure other than structure shown in FIG. 3, and the feedback signal VFB may represent different physics meaning.

Continuing to FIG. 3, the control signal generator 215 generates the control signal CTRL by means of average current control method. The control signal generator 215 comprises a first comparator 312, having a non-inverting input terminal, an inverting input terminal and an output terminal, wherein the non-inverting input terminal receives a sensed slope signal Slope indicative of a current, and wherein the inverting input terminal is coupled to the output terminal of the error amplifier 213 to receive the compensating signal COMP. The sensed slope signal Slope is determined by an average current of the load current through each of LED string plus a sawtooth wave signal. The output terminal of the first comparator 312 provides a PWM signal as the control signal CTRL. One with ordinary skill in the art could understand that in other embodiments, the control signal generator 215 may has different circuit structure with different control method to generate the control signal CTRL. For an instance, in another embodiment, the control signal generator 215 may comprise a comparator and a flip-flop, to generate the control signal CTRL via peak current control method. And in yet another embodiment, the control signal generator 215 may has a comparator and a timer, to generate the control signal CTRL via constant on-time control method.

Seen in FIG. 3, the over-shoot detecting circuit 216 comprises a hysteresis comparator 313, having a non-inverting input terminal, an inverting input terminal and an output terminal, wherein the non-inverting input terminal receives the second reference signal Vref2, and wherein the inverting input terminal is coupled to the output terminal of the sensing circuit 212 to receive the feedback signal VFB. The output terminal of the over-shoot detecting circuit 216 generates the over-shoot signal SHOT. In one embodiment, when the feedback signal is larger than the second reference signal Vref2, the over-shoot signal SHOT falls from high level to low level to deactivate the switching signal Vsw, and when the feedback is smaller than the difference between the second reference signal Vref2 and a hysteresis voltage Voffset, the over-shoot signal SHOT jumps from low level to high level to activate the switching signal Vsw. In one embodiment, Vref2−Voffset>Vref1.

In one embodiment, the logic circuit 217 comprises a driver 314 and a first switch 315. The driver 314 comprises an input terminal, a power supply terminal, a ground terminal and an output terminal, wherein the input terminal of the driver 314 is coupled to the control signal generator 215, and the ground terminal is connected to the system reference ground GND. The first switch 315 has a first terminal, a second terminal and a control terminal, wherein the first terminal is coupled to a power supply voltage Vcc, and wherein the second terminal is coupled to the power supply terminal of the driver 314, and further wherein the control terminal receives the over-shoot signal SHOT from the over-shoot detecting circuit 216. In the illustrated embodiment, when the over-shoot signal SHOT is at high level, the first switch 315 is turned on, and thus the driver 314 is enabled to activate the switching signal Vsw. When the over-shoot signal SHOT is at low level, the first switch 315 is turned off and thus the driver 314 is disabled to deactivate the switching signal Vsw.

In yet another embodiment, the LED driver system 30 further comprises the system over-voltage protection circuit 218. The system over-voltage protection circuit 218 comprises a second comparator 316 and a resistor divider 317. The resistor divider 317 is coupled between the output terminal of the LED driver system 30 and the system reference ground GND, configured to divide the output voltage VOUT of the LED driver system 30, and to generate a divided voltage VDIV. The divided voltage VDIV follows the output voltage VOUT. The second comparator 316 has a non-inverting input terminal, an inverting input terminal and an output terminal, wherein the non-inverting input terminal receives the third reference voltage Vref3, and wherein the inverting input terminal receives the divided voltage VDIV. When the output voltage VOUT is overshot, the output of the second comparator 316 is turned from high level to low level. In one embodiment, the logic circuit further comprises a second AND gate 318, having two input terminals and an output terminal, wherein the two input terminals are respectively coupled to the output terminal of the driver 314, and the output terminal of the second comparator 316. The output terminal of the second AND gate 318 provides the switching signal Vsw to control the main switch 202 ON and OFF.

In yet another embodiment, the LED driver system 30 further comprises a LED load over-current protection circuit 219, wherein the LED load over-current protection circuit 219 comprises N units, and each of the units is coupled to a LED string. Each of the units comprises a third comparator 319 and a second switch 320. The comparator 319 has a non-inverting input terminal, an inverting input terminal and an output terminal, wherein the non-inverting input terminal receives the fourth reference signal Vref4, and wherein the inverting input terminal is coupled to a corresponding LED string to receive the sensed signal indicative of the current through the corresponding LED string. The second switch 320 has a first terminal, a second terminal and a control terminal, wherein the first terminal and the second terminal is respectively connected to the corresponding sensing resistor and the system reference ground GND, and the control terminal is coupled to the output terminal of the third comparator 319. When the sensed signal of the corresponding LED string is smaller than the fourth reference signal Vref4, the third comparator 319 generates a low level output, and the second switch is turned on, which indicates that this LED string branch works normally. When a LED string branch experiences malfunction, for example, short circuit fault, the sensed signal of this branch rises to a level higher than the fourth reference voltage, and the third comparator 319 generates a low level signal to turn the second switch 320 off, so as to disconnect this LED string branch from the driver system 30 for over-current protection.

One with ordinary skill in the art should know that in other embodiment, the system over-voltage protection circuit 218 and the LED string over-current protection 219 may have other conventional circuit structure. The circuit structures according to the above embodiments are for illustration purpose and are not intended to limit the scope of the present invention.

Figure 4A:
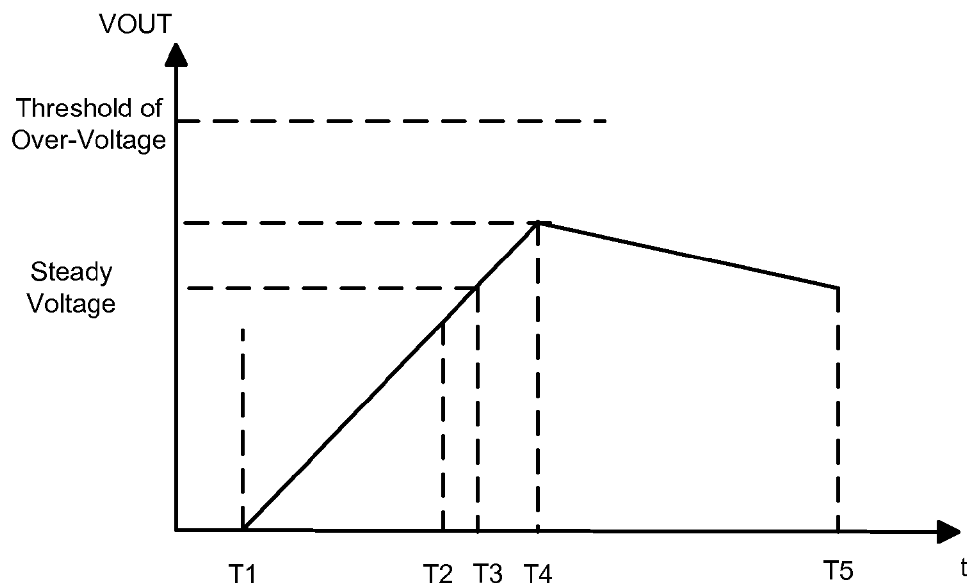
FIGS. 4A-4C illustrate an operative wave form diagram of the LED driver system 30 according to an embodiment of the present invention.
Figure 4B:
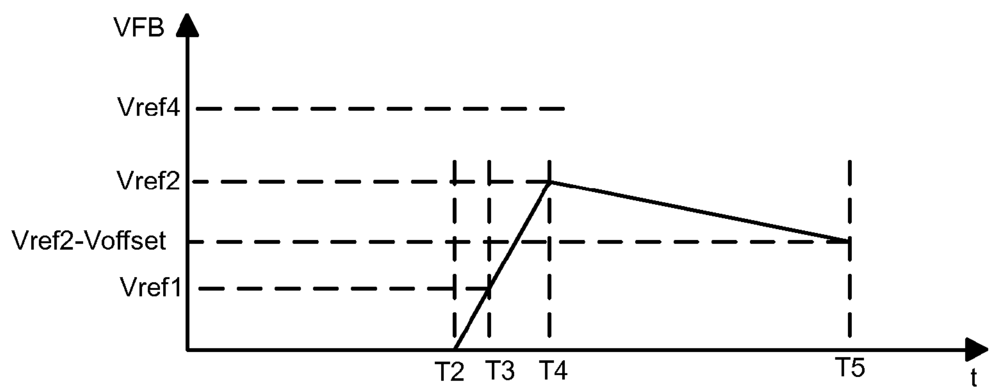
Figure 4C:
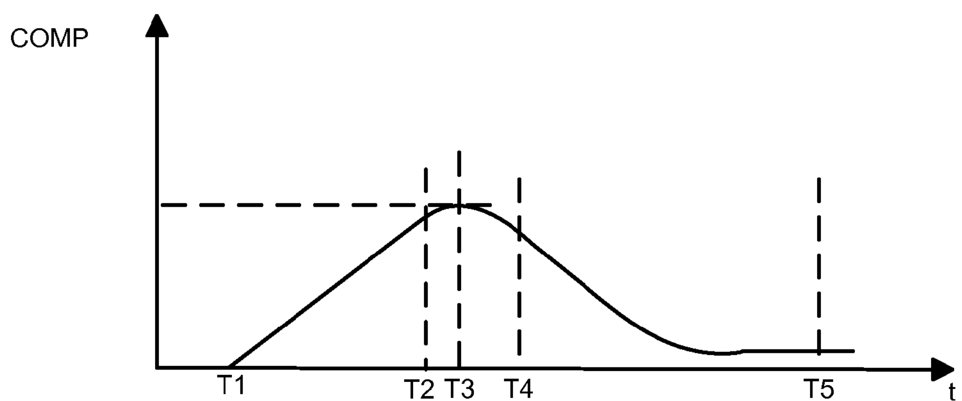

FIGS. 4A-4C illustrate a operative wave form diagram of the LED driver system 30 according to an embodiment of the present invention. The following description combined with FIGS. 4A-4C will illustrate the starting process of LED driver system 30 under light load. At the moment T1, the LED driver system begins starting, and the main switch 202 is in operation. The output voltage VOUT gradually rises up. However, as shown in FIG. 4A, the output voltage VOUT is lower than the threshold voltage of the LED strings, and the LED strings are kept shutting off. Accordingly no current flows through the LED strings, and the feedback signal VFB is zero, as shown in FIG. 4B. The difference between the first reference signal Vref1 and the feedback signal VFB is relatively large, and thereby a relatively large charging current is generated to charge the compensating capacitor CCOMP in the compensating network 214. The compensating signal COMP rises up with a relatively large slope, as shown in FIG. 4C. At the moment T2, the output voltage is large enough to turn on the LED strings. Current flows through and lightens the LED strings. The feedback signal VFB also rises up, as shown in FIG. 4B. At this time, the difference between the feedback signal VFB and the first reference signal Vref1 decreases gradually, so that the charging current from the output terminal of the error amplifier 213 also decreases, and the rising of the compensating signal COMP slows down as shown in FIG. 4C. At the moment T3, the output voltage VOUT arrives at a steady level, VFB=Vref1, and the error amplifier 213 stops charging the compensating capacitor CCOMP. After the moment T3, as the compensating signal COMP is relatively large, the output voltage VOUT continues rising up, and the feedback signal VFB follows the output voltage VOUT, as shown in FIG. 4A and 4B. As a result, VFB>Vref1, the compensating capacitor CCOMP sources current to the output terminal of the error amplifier 213. The compensating signal COMP gradually decreases, as shown in FIG. 4C. Due to the compensating capacitor CCOMP, it takes time for the compensating signal COMP to come back to a steady level. During such time, the output voltage VOUT and the feedback signal VFB do not stop rising up, as shown in FIG. 4A.

At the moment T4, seen in FIG. 4B, the feedback signal VFB is larger than the second reference signal Vref2, the over-shoot signal SHOT falls to low level, so as to clamp the switching signal Vsw at low level. The main switch 202 is turned off. Discharged by the LED load, the output voltage VOUT associated with the feedback signal VFB slowly declines, and thus prevents triggering the system over-voltage protection circuit 218 and the LED load over-current protection circuit 219. Once the feedback signal VFB is larger than the first reference signal Vref1, the compensating signal COMP will continue declining. At the moment T5, seen in FIG. 4B, the feedback signal VFB is lower than Vref2-Voffset, the hysteresis comparator generates a high level over-shoot signal SHOT. The main switch 202 is restored to work normally. As per the compensating signal COMP declining to a steady level, the system enters into steady status.

Figure 5A:
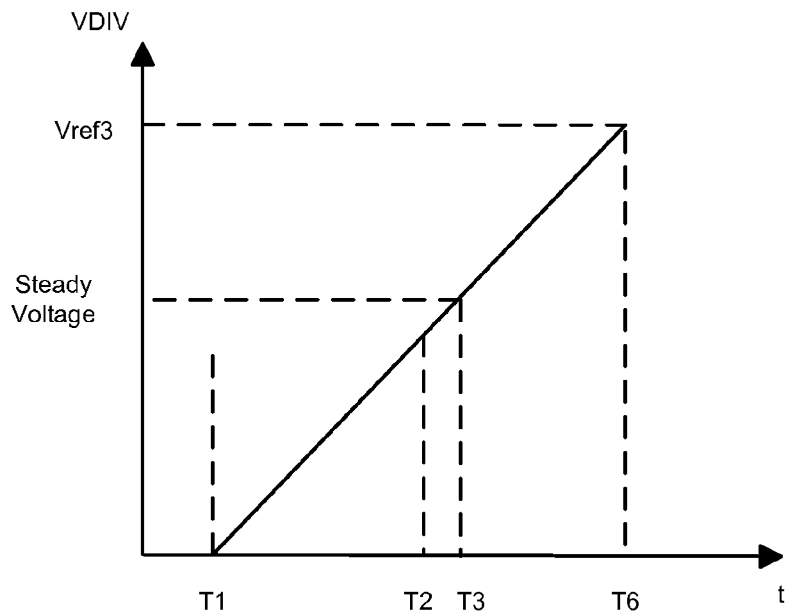
FIGS. 5A-5C illustrate an operational waveform diagram of a soft-start LED driver system controlled by the LED driver controller 10 as a prior art.
Figure 5B:
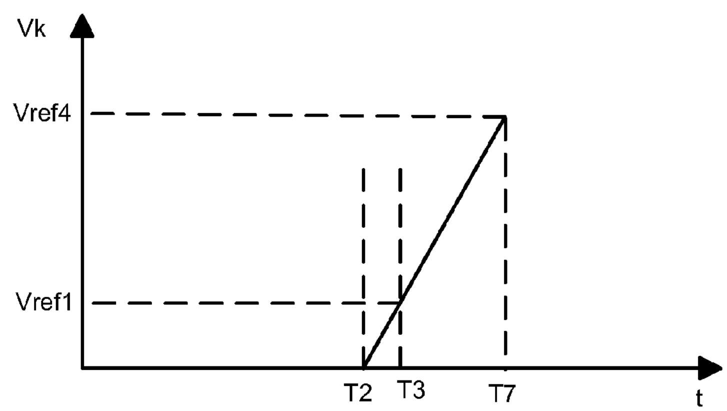
Figure 5C:
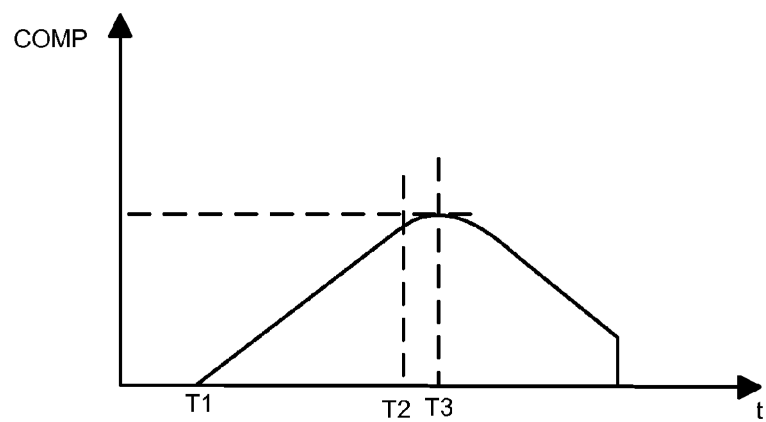

FIGS. 5A-5C illustrate an operational waveform diagram of a soft-start LED driver system controlled by the LED driver controller 10 as a prior art. As shown in FIGS. 5A-5C, before the moment T3, the operational waveform is similar to the waveform of LED driver system 30 shown in FIGS. 4A-4C. After the moment T3, the output voltage VOUT and the feedback signal VFB also keep rising, and the compensating signal COMP gradually declines. Before the compensating signal COMP arrives at steady level, the divided voltage VDIV following the output voltage VOUT may rise to a level larger than the third reference signal Vref3 at the moment T6 (shown in FIG. 5A), and therefore the system over-voltage protection is triggered. Likewise, the sensed signal Vk of certain LED string branch may rise to a level larger than the fourth reference signal Vref4 (shown in FIG. 5B), and thus triggers the LED string over-current protection to disconnect this LED string branch from the LED driver system.

Figure 6:
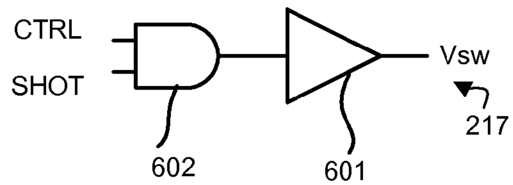
FIG. 6 illustrates a schematic circuit diagram of the logic circuit 217 according to another embodiment of the present invention.

FIG. 6 illustrates a schematic circuit diagram of the logic circuit 217 according to another embodiment of the present invention. As shown in FIG. 6, the logic circuit 217 comprises a driver 601 and a first AND gate 602. The first AND gate 602 has a first input terminal, a second input terminal and an output terminal, wherein the first input terminal is coupled to the output terminal of the control signal generator 215 to receive the control signal CTRL, and wherein the second input terminal receives the over-shoot signal SHOT. An input terminal of the driver 601 is coupled to the output terminal of the first AND gate 602. The output terminal of the driver 601 provides the switching signal Vsw to control the main switch 202. When VFB>Vref2, the over-shoot signal SHOT falls to low level. At this time, despite of the control signal CTRL, the output of the AND gate 602, i.e. the switching signal Vsw is always at low level, to turn the main switch 202 off and avoid to trigger over-voltage protection.

Figure 7:
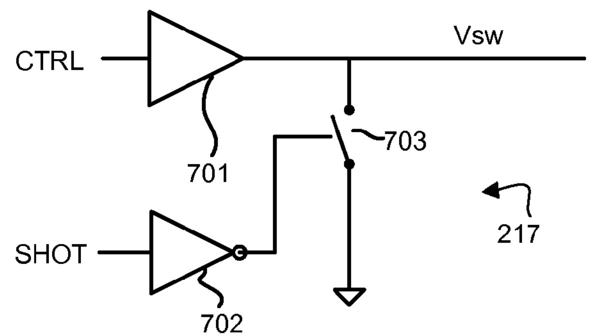
FIG. 7 illustrates a schematic circuit diagram of the logic circuit 217 according to yet another embodiment of the present invention.

FIG. 7 illustrates a schematic circuit diagram of the logic circuit 217 according to yet another embodiment of the present invention. Seen in FIG. 7, the logic circuit 217 comprises a driver 701, an inverter 702 and a second switch 703. An input terminal of the driver 701 receives the control signal CTRL from the control signal generator 215 and an output terminal of the driver 701 provides the switching signal Vsw. An input terminal of the inverter 702 receives the over-shoot signal SHOT. The second switch 703 has a first terminal, a second terminal and a control terminal, wherein the first terminal is coupled to the output terminal of the driver 701, and wherein the second terminal is connected to the system reference ground GND, and further wherein the control terminal is coupled to the output terminal of the inverter 702. When VFB>Vref2, the over-shoot signal SHOT falls to low level, and the inverter 702 generates a high level signal to turn the second switch 703 on. In one embodiment, the second switch 703 is an N-type metal oxide semiconductor field effect transistor (NMOSFET). As the second switch 703 is turned on, the switching signal Vsw is clamped to ground level and deactivated, so as to keep the main switch off and to avoid triggering the over-voltage protection. In another embodiment, the logic circuit 217 may be without the inverter 702, and the control terminal directly receives the over-shoot signal SHOT. The second switch 703 in this embodiment may be a P-type MOSFET.

One with ordinary skill in the art could understand that the structure of logic circuit 217 is not limited to the above embodiments. In other embodiments, the logic circuit 217 may has other suitable structure to perform similar functions as described above.

Figure 8:
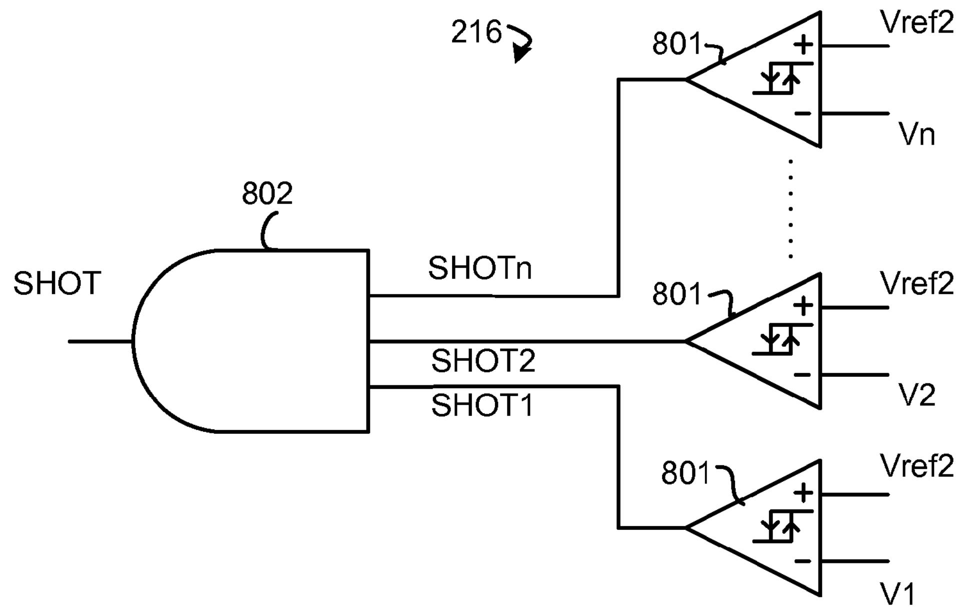
FIG. 8 illustrates a schematic circuit diagram of the over-shoot detecting circuit 216 according to another embodiment of the present invention.

FIG. 8 illustrates a schematic circuit diagram of the over-shoot detecting circuit 216 according to another embodiment of the present invention. In the illustrated embodiment, the LED load 211 comprises N LED strings LED1, LED2 . . . LEDN. The over-shoot detecting circuit 216 comprises N hysteresis comparators 801, wherein each of comparators 801 has a non-inverting input terminal, an inverting input terminal and an output terminal, wherein the non-inverting input terminal of the hysteresis comparator 801 receives the second reference signal Vref2, and wherein the inverting input terminal is coupled to a corresponding LED strings. The hysteresis comparators 801 generate branch over-shoot detecting signals SHOT1, SHOT2 . . . SHOTN according to the second reference signal Vref2 and the load current through the LED strings (represented by the sensed signals V1, V2 . . . VN). The over-shoot detecting circuit 216 further comprises an AND gate 802, having N input terminals and an output terminal, wherein the N input terminals are respectively coupled to the output terminals of hysteresis comparators 801 to receive the branch over-shoot detecting signals SHOT1, SHOT2 . . . SHOTN. The output terminal of the AND gate 802 generates the over-shoot signal SHOT.

One with ordinary skill in the art could understand that the structure of over-shoot detecting circuit 216 is not limited to above embodiment. In other embodiments, according to the control method and the feedback loop of the LED driver system, the over-shoot detecting circuit 216 may has other different structure to generate the over-shoot signal SHOT.

Figure 9:
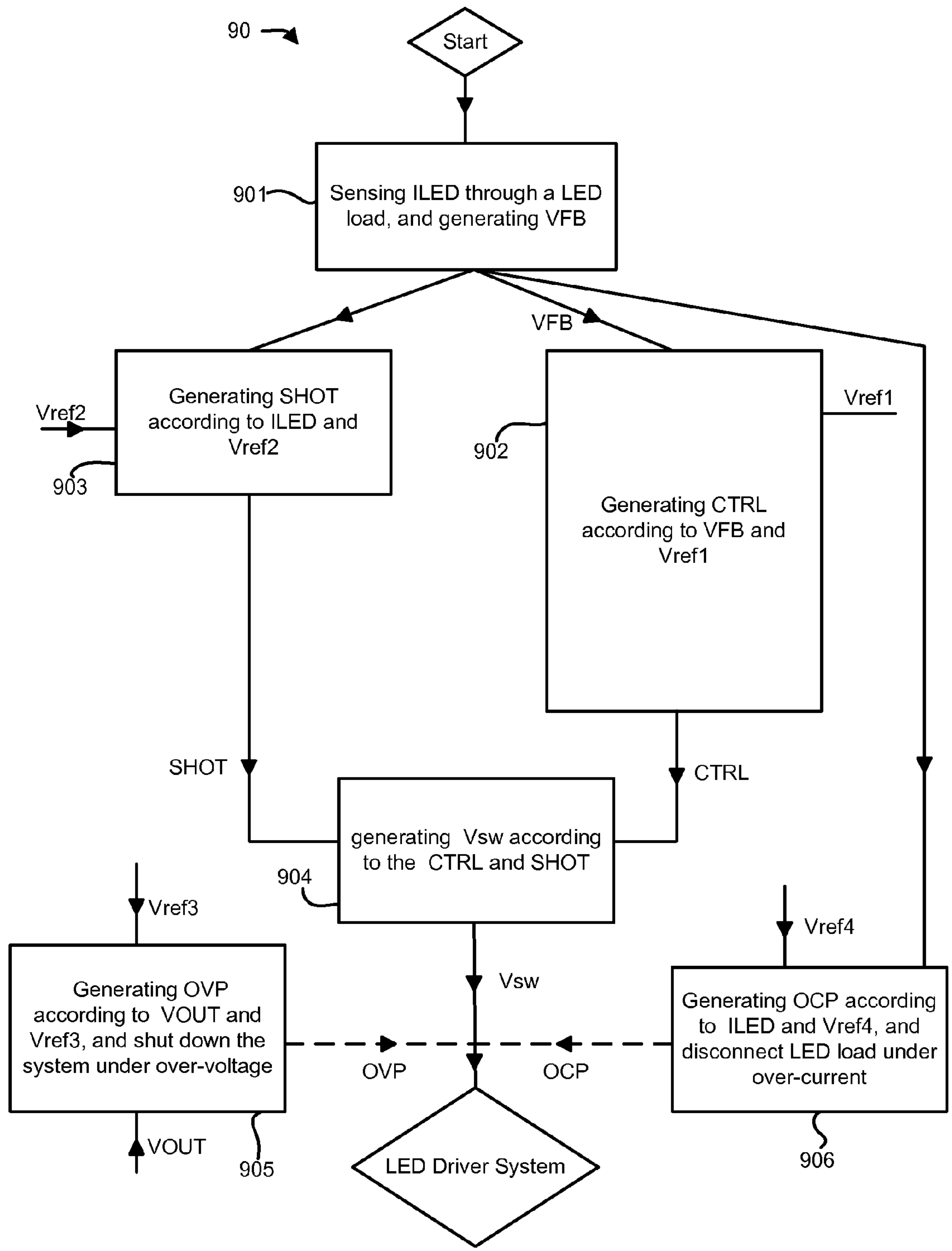
FIG. 9 illustrates a block diagram of a control method 90 for controlling a LED driver system according to an embodiment of the present invention.

FIG. 9 illustrates a block diagram of a control method 90 for controlling a LED driver system according to an embodiment of the present invention. The control method 90 comprises:

Step 901: sensing a load current ILED through a LED load, and generating a feedback signal VFB accordingly;

Step 902: generating a control signal CTRL according to the feedback signal VFB and a first reference signal Vref1;

Step 903: generating an over-shoot signal SHOT according to the load current ILED of the LED load and a second reference signal Vref2;

Step 904: generating a switching signal Vsw according to the control signal CTRL and the over-shoot signal SHOT, the switching signal Vsw controlling power switches in the LED driver system.

Wherein the second reference signal is larger than the first reference signal.

In one embodiment, the LED load comprises N LED strings, where N is a positive integer. The over-shoot signal SHOT is determined by the second reference signal Vref2 and a minimum current among N load currents respectively through N LED strings.

In another embodiment, the feedback signal VFB is determined by the minimum current among N load currents respectively through N LED strings, and the over-shoot signal SHOT is determined by the feedback signal VFB and the second reference signal Vref2. The control signal CTRL may be a PWM signal. In yet another embodiment, the PWM signal is generated through average current control method according to the feedback signal VFB, the first reference signal Vref1 and a sensed slope signal Slope, wherein the sensed slope signal Slope comprises the average current of the load current through each LED string plus a sawtooth wave signal.

In one embodiment, the step 903 further comprises: generating a sensed signal according to the current through the LED load, when the sensed signal is larger than the second reference signal Vref2, the over-shoot signal SHOT falls from high level to low level. After then, if the sensed signal is smaller than the difference between the second reference signal Vref2 and a hysteresis signal Voffset, the over-shoot signal jumps from low level to high level.

In one embodiment, the control method 90 further comprises a step 905: generating a system over-voltage protection signal OVP according to the output voltage VOUT of the LED driver system and a third reference signal Vref3. When over-voltage is detected on the output voltage VOUT accordingly, the system over-voltage protection signal OVP manages to shut the LED driver system off.

In one embodiment, the control method 90 further comprises a step 907: generating a LED load over-current protection signal OCP according to the load current ILED and a fourth reference signal Vref4. When over-current is detected on the LED load accordingly, the LED load over-current protection signal OCP manages to disconnect the LED load from the LED driver system.

In one embodiment, the first reference signal Vref1 is smaller than the difference between the second reference signal Vref2 and the hysteresis signal Voffset, and the second reference signal Vref2 is smaller than the third reference signal Vref3 and the fourth reference signal vref4.

Although the specification proposes some embodiments, it should not be understood as a limitation of the present invention. By reading the above text, one skilled in relevant art may master transformations or variations other than the described embodiments. For example, the above embodiments take n-channel device as example, however, by change the conductivity types of semiconductor region, the embodiments of the present invention may also applied in p-channel device. Therefore these transformations or variations should be included in the scope of protection of the present invention.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A light emitting diode (LED) driver system, comprising:

a LED converter at least comprising a main switch, the LED converter configured to convert an input voltage to an output voltage to drive a LED load;

a sensing circuit having an input terminal and an output terminal, wherein the input terminal is coupled to the LED load, the sensing circuit configured to generate a feedback signal on the output terminal according to a load current through the LED load;

an over-shoot detecting circuit coupled to the sensing circuit and further receiving a second reference signal, the over-shoot detecting circuit configured to generate an over-shoot signal according to the load current and the second reference signal;

a logic circuit configured to receive the over-shoot signal and a control signal, and to generate a switching signal accordingly to control the main switch ON and OFF, wherein the control signal is generated according to the feedback signal and a first reference signal; and wherein the second reference signal is larger than the first reference signal.

2. The LED driver system according to claim 1, further comprising a system over-voltage protection circuit and a LED load over-current protection circuit;

wherein the system over-voltage protection circuit receives the output voltage and a third reference signal, operable to shut down the LED driver system when over-voltage is detected on the output voltage according to the output voltage and the third reference signal;

wherein the LED load over-current protection circuit is coupled to the sensing circuit, and further receives a fourth reference signal, the LED load over-current protection circuit configured to disconnect the LED load from the LED driver system when over-current is detected on the LED load; and wherein the second reference signal is smaller than the third reference signal and the fourth reference signal.

3. The LED driver system according to claim 1, wherein the LED load comprises N LED strings, and wherein N is a positive integer.

4. The LED driver system according to claim 3, wherein the feedback signal is determined by a minimum current among N load currents respectively through N LED strings; and wherein the over-shoot circuit comprises a hysteresis comparator, the hysteresis comparator having a non-inverting input terminal, an inverting input terminal and an output terminal, the non-inverting input terminal receiving the second reference signal, the inverting terminal receiving the feedback signal, and the output terminal generating the over-shoot signal.

5. The LED driver system according to claim 4, wherein the sensing circuit comprises N sensing units, respectively coupled to the N LED strings, wherein each of sensing unit comprises:

a sensing resistor, the sensing resistor coupled between a corresponding LED string and the system reference ground; and a diode, wherein an anode of the diode is coupled to a junction of the sensing resistor and the corresponding LED string, and wherein a cathode of the diode is connected to cathodes of all other diodes in other sensing units to provide the feedback signal.

6. The LED driver system according to claim 3, wherein the over-shoot circuit comprises N hysteresis comparators, wherein each of hysteresis comparators has a non-inverting input terminal, an inverting input terminal and an output terminal, the non-inverting input terminal receiving the second reference signal, the inverting input terminal coupled to one LED string, and wherein each of the hysteresis comparators provides an over-shoot detecting signal of a corresponding LED string according to the load current through the corresponding LED string and the second reference signal.

7. The LED driver system according to claim 3, wherein the over-shoot circuit comprises at least a hysteresis comparator, the hysteresis comparator having a hysteresis voltage, and wherein the difference between the second reference signal and the hysteresis voltage is larger than the first reference signal.

8. The LED driver system according to claim 1, wherein the logic circuit comprises a driver.

9. The LED driver system according to claim 8, wherein the logic circuit further comprises a first switch, and wherein:

the driver has an input terminal, an output terminal and a power supply terminal, and the input terminal of the driver receives the control signal; and the first switch has a first terminal, a second terminal and a control terminal, wherein the first terminal is coupled to a power supply voltage, and the second terminal is coupled to the power supply terminal of the driver, and the control terminal receives the over-shoot signal.

10. The LED driver system according to claim 8:

wherein the logic circuit further comprises a first AND gate, the first AND gate having a first input terminal, a second input terminal and an output terminal, wherein the first input terminal receives the control signal, and wherein the second terminal receives the over-shoot signal; and wherein the input terminal of the driver is coupled to the output terminal of the first AND gate, and wherein the output terminal of the driver is coupled to the main switch to provide the switching signal.

11. The LED driver system according to claim 8, wherein the input terminal of the driver receives the control signal, and wherein the logic circuit further comprises:

an inverter having an input terminal and an output terminal, wherein the input terminal receives the over-shoot signal; and a second switch having a first terminal, a second terminal and a control terminal, wherein the first terminal is coupled to the output terminal of the driver, and the second terminal is coupled to the system reference ground, and the control terminal is coupled to the output terminal of the inverter.

12. The LED driver system according to claim 8, further comprising a system over-voltage protection circuit:

wherein the system over-voltage protection circuit receives the output voltage and a third reference signal, and operable to shut down the LED driver system when over-voltage is detected on the output voltage according to the output voltage and the third reference signal; and wherein the logic circuit further comprises a second AND gate, the logic circuit having two inputs respectively coupled to the output terminal of the driver and the system over-voltage protection circuit, and having an output terminal coupled to the main switch, wherein the second reference signal is smaller than the third reference signal.

13. A light emitting diode (LED) driver controller, comprising:

a sensing circuit coupled to a LED load with an input terminal, generating a feedback signal on an output terminal according to a load current through the LED load;

an over-shoot detecting circuit coupled to the sensing circuit, and further receiving a second reference signal, configured to generate an over-shoot signal according to the load current and the second reference signal;

a logic circuit receiving the over-shoot signal and a control signal, configured to generate a switching signal accordingly to control the main switch ON and OFF, wherein the control signal is generated according to the feedback signal and a first reference signal; and wherein the second reference signal is larger than the first reference signal.

14. A method for controlling a light emitting diode (LED) driver circuit, comprising:

sensing a load current through a LED load, and generating a feedback signal accordingly;

generating a control signal according to the feedback signal and a first reference signal;

generating an over-shoot signal according to the load current on the LED load and a second reference signal;

generating a switching signal according to the control signal and the over-shoot signal, the switching signal controlling power switches in the LED driver system; and wherein the second reference signal is larger than the first reference signal.

15. The method for controlling the LED driver system according to claim 14, further comprising:

generating a system over-voltage protection signal according to an output voltage of the LED driver system and a third reference signal, and shutting down the LED driver system when over-voltage is detected on the output voltage according to the output voltage and the third reference signal;

disconnecting the LED load from the LED driver system when over-current is detected on the LED load according to the load current and a fourth reference signal; and wherein the second reference signal is smaller than the third reference signal and the fourth signal.

16. The method for controlling the LED driver system according to claim 14, wherein the LED load comprises N LED strings, and wherein N is a positive integer, and further wherein the over-shoot signal is determined by the second reference signal and a minimum current among N load currents respectively through N LED strings.

17. The method for controlling the LED driver system according to claim 16, wherein the feedback signal is determined by the minimum current and wherein the over-shoot signal is determined by the feedback signal and the second reference signal.

18. The method for controlling the LED driver system according to claim 14, wherein if the over-shoot signal is at high level, the switching signal is activated, and wherein if the over-shoot signal is at low level, the switching signal is deactivated.

19. The method for controlling the LED driver system according to claim 14, wherein generating the over-shoot signal comprises:

generating a sensed signal according to the load current through the LED load;

the over-shoot signal falling from high level to low level if the sensed signal is larger than the second reference signal; and after the over-shoot signal being at low level, the over-shoot signal jumping from low level to high level if the sensed signal is smaller than a difference between the second reference signal and a hysteresis signal.

20. The method for controlling the LED driver system according to claim 19, wherein the difference between the second reference signal and a hysteresis signal is larger than the first reference signal.

* * * * *